S. O. BARTOW.
Harvester.
No. 74,036.                       Patented Feb. 4, 1868.
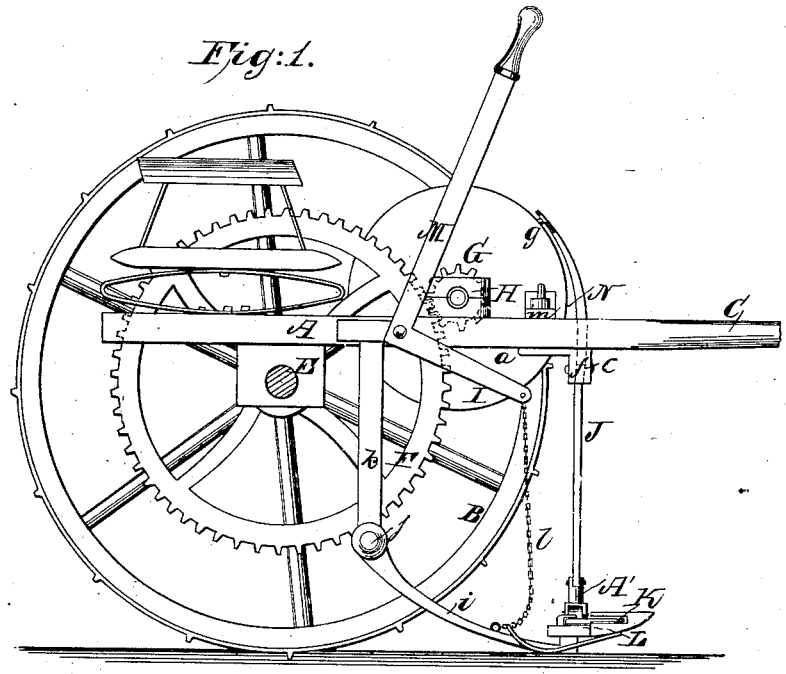
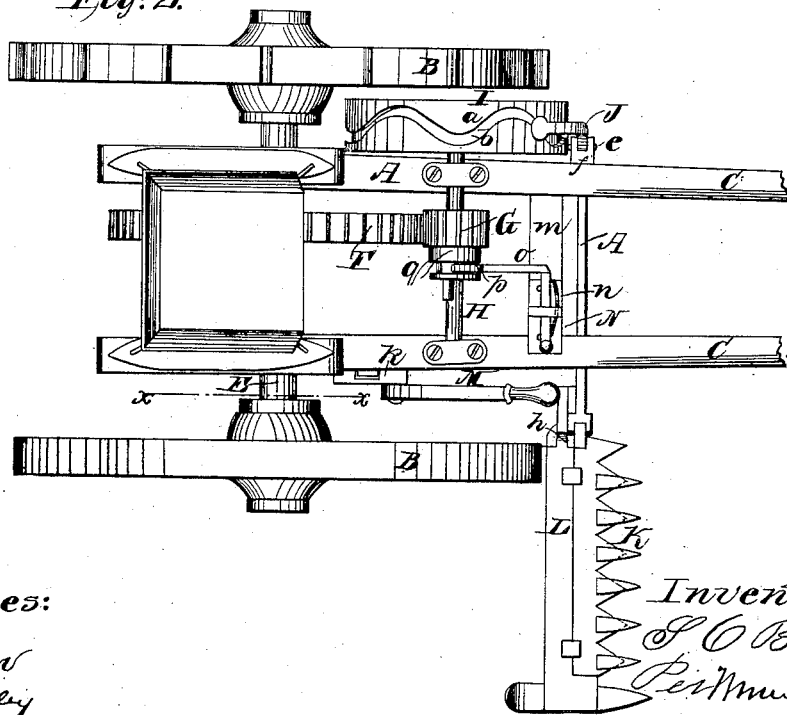

UNITED STATES PATENT OFFICE.

S. O. BARTOW, OF BETHEL, CONNECTICUT.

IMPROVEMENT IN HARVESTERS.

Specification forming part of Letters Patent No. 74,036, dated February 4, 1868.

*To all whom it may concern:*

Be it known that I, S. O. BARTOW, of Bethel, in the county of Fairfield and State of Connecticut, have invented a new and Improved Grain and Grass Harvester; and that the following description, taken in connection with the accompanying drawings, hereinafter referred to, forms a full and exact specification of the same, wherein I have set forth the nature and principles of my said improvements, by which my invention may be distinguished from all others of a similar class, together with such parts as I claim and desire to have secured to me by Letters Patent.

This invention relates to a new and improved grain and grass harvester; and consists in an improved sickle-driving mechanism, and an arrangement of the frame of the machine and gearing, as hereinafter fully shown and described, whereby a very rapid motion of the sickle is obtained, and a clean, smooth cut of the same is obtained with a moderate expenditure of power.

In the accompanying sheet of drawings, Figure 1 is a side sectional view of my invention, taken in the line $x$ $x$, Fig. 2; Fig. 2, a plan or top view of the same.

Similar letters of reference indicate like parts.

A represents the main frame of the machine, which is mounted on large wheels B B, and is provided, in this instance, with thills C, a draft-pole being, of course, used with a two-horse machine. D is the driver's seat, placed on the main frame. The wheels B B are firmly secured on their axle E, and on the axle there is keyed or otherwise secured a spur-wheel, F, which gears into a pinion, G, on a shaft, H, said pinion being fitted on said shaft with a feather or groove, and allowed to slide on the shaft H, so that it may be thrown in and out of gear with the spur-wheel F, but at the same time always turn shaft H when the machine is in motion and the pinion G in gear with the spur-wheel F. On one end of the shaft H there is fitted a cam, I, composed of a wheel, $a$, having a sinuous groove, $b$, in its periphery, as shown clearly in Fig. 2.

J is a lever, having its fulcrum $c$ in a pendant, $f$, secured to the under side of one of the thills. The upper end of this lever is provided with a pin, $g$, which is fitted in the sinuous groove $b$ of the cam, and the lower end of the lever is attached to a pitman, A′, one end of the latter being connected to a sickle, K, which works on a finger-bar, L, as usual.

The inner end of the finger-bar L is attached by a joint, $h$, to an arm, $i$, the rear end of which is connected by a pivot, $j$, to a fixed pendant, $k$, secured to the main frame A. The arm $i$ is connected by a chain, $l$, to the lower end of a bent lever, M, at one side of the main frame.

On account of the frame A being mounted on large wheels B B, a spur-wheel, F, of quite large diameter, may be used, and this, in connection with the cam I and lever J, gives a very rapid motion to the sickle K.

The pinion G may be moved on its shaft H and thrown in and out of gear with the spur-wheel F by means of a rod, $o$, having a fork, $p$, at its end, fitting in a groove made circumferentially in the hub $g$ of the pinion. This rod $o$ is operated by means of a sliding spring-catch, N $n$, on the transverse bar $m$, as shown in Fig. 2.

The sickle may be raised free from the ground or above any obstruction which may lie in its path, and in moving the machine from place to place the finger-bar and sickle may be turned up in a vertical plane, and then elevated so as to be entirely out of the way.

Having thus described my invention, I claim as new and desire to secure by Letters Patent—

1. The construction and arrangement of the pendent bar $k$, pivoted arm $i$, finger-bar L, pitman A′, right-angular lever M, and chain $l$, all operating as described, for the purpose specified.

2. The arrangement of the gear-wheel $p$ upon the shaft of the wheels B, sliding pinion G upon shaft H, bearing the cam-wheel I, lever J, having its fulcrum in the pendant $f$ upon the side of the shaft A, pitman A′, finger-bar L, pivoted arm $i$, pendent bar $k$, right-angular lever M, and chain $l$, all operating as herein shown and described.

S. O. BARTOW.

Witnesses:
G. S. PECK,
G. M. LYON.